United States Patent
Cliche et al.

(10) Patent No.: US 9,906,569 B2
(45) Date of Patent: Feb. 27, 2018

(54) METHOD AND APPARATUS FOR BIDIRECTIONAL EMULATION OF TELEPHONIC DEVICE COMMUNICATION

(71) Applicant: E-MetroTel Global Inc., Plano, TX (US)

(72) Inventors: Stephane Cliche, Orleans (CA); Ardavan Nawaby, Plano, TX (US); Steve Pallen, Kanata (CA); Joseph Abraham, Belleville (CA); Misha Vodsedalek, Prague (CZ); Unni Pisharodi, Belleville (CA); Osmond Ryall, Belleville (CA)

(*) Notice: Subject to any disclaimer, the term of this patent is extended or adjusted under 35 U.S.C. 154(b) by 68 days.

(21) Appl. No.: 14/841,128

(22) Filed: Aug. 31, 2015

(65) Prior Publication Data

US 2016/0065624 A1 Mar. 3, 2016

Related U.S. Application Data

(60) Provisional application No. 62/044,236, filed on Aug. 30, 2014.

(51) Int. Cl.
*H04L 12/66* (2006.01)
*H04L 29/06* (2006.01)
*H04M 7/00* (2006.01)
*H04M 3/42* (2006.01)

(52) U.S. Cl.
CPC ...... *H04L 65/1069* (2013.01); *H04L 65/1006* (2013.01); *H04L 65/1026* (2013.01); *H04L 65/1036* (2013.01); *H04M 7/00* (2013.01); *H04M 7/006* (2013.01); *H04M 3/42314* (2013.01)

(58) Field of Classification Search
CPC ............ H04L 65/1069; H04L 65/1006; H04L 65/1036; H04L 65/1026; H04M 7/00; H04M 7/006
USPC ........................................................ 370/352
See application file for complete search history.

(56) References Cited

U.S. PATENT DOCUMENTS

| | | | | |
|---|---|---|---|---|
| 2004/0229608 A1* | 11/2004 | Isukapalli | ............... | H04L 29/06 455/432.1 |
| 2009/0141883 A1* | 6/2009 | Bastien | ................... | H04L 63/00 379/213.01 |
| 2010/0208873 A1* | 8/2010 | Chambers | ......... | H04M 3/42391 379/52 |

(Continued)

*Primary Examiner* — Sai-Ming Chan
(74) *Attorney, Agent, or Firm* — John Lindsay (57) ABSTRACT

The present systems and processes are directed to bridging telephone communications, such that a SIP communication server is able to communicate with the legacy PBX or key system interface for interworking connectivity of the devices. A bidirectional emulator module is provided permitting a communication session with legacy analog device and/or digital device. In certain embodiments, analog and digital telephones are registered with the emulator. An external telephone system such as a SIP communication server is also registered. A line dictionary contains the communication protocols of the analog and digital telephones and external telephone system. Outgoing line traffic and incoming line traffic are monitored in real-time, where the emulator module translates the user requests and line traffic according to the respective communication protocol data retrieved from the line dictionary.

20 Claims, 6 Drawing Sheets

(56) References Cited

U.S. PATENT DOCUMENTS

2015/0193267 A1\* 7/2015 Shafer .................... G06F 9/468
719/320

\* cited by examiner

METHOD AND APPARATUS FOR BIDIRECTIONAL EMULATION OF TELEPHONIC DEVICE COMMUNICATION

PRIORITY

The present invention claims priority to provisional application 62/044,236, which has a filing date of Aug. 30, 2014, which is incorporated by reference.

FIELD OF THE INVENTION

The present invention is in the field of telephony communication, and more particularly, for a method and apparatus for bridging telephonic communication systems and devices.

DESCRIPTION OF THE RELATED ART

Legacy Private Branch Exchange (PBX) and key systems supporting analog and digital telephony devices have been widely deployed and continue to be used in service globally. These types of communication technology provide basic or enhanced telephone service and are widely deployed. A significant number of these systems have been developed using vendor specific proprietary hardware and software for core communication platforms, network signaling and end-user devices, which leads to homogeneous device deployment at a given enterprise. Integrating multi-vendor communication systems and devices has been limited. The ability to support common basic functionality across multi-vendor product platforms is generally permitted but for only a subset of the available vendor features.

With the advent of Voice over IP (VoIP) technology and Session Initiated Protocol (SIP), legacy PBX and key systems, vendors have had to either adapt their systems to permit support over data networks, develop hybrid systems that can operate as a traditional time division multiplex based system or IP-based system, or develop replacement SIP-only communication systems. Development efforts to carry forward legacy systems, analog and digital phones have been vendor specific and generally took into account product hardware and software life cycles in determining research and development investment merits.

Compatibility and support challenges of mixed technology and mixed vendor solutions or lack thereof, the ability to continue using existing legacy PBX and key systems including the analog and digital devices, the device features and core system functionality has consequently been impaired. These systems and their devices may be integrated with newer SIP communication server technology but will result in loss of most of the features and functionality previously available on the analog and digital devices.

Open standard SIP-based VoIP communication technology by design can facilitate integration of multi-vendor communications systems and devices that meet SIP protocol implementation. Little industry attention in helping bridge and retain use of legacy PBX and key systems and retaining physical device and features within a SIP-based communication network are expended, given the challenges of developing equivalent legacy system functionality and device features as SIP protocol implementation. This leads to additional capital expenditure for enterprises when migrating to SIP-based communication server technology due to replacement of legacy PBX and key systems, devices and peripherals. For small and medium-size enterprises, the cost of replacing analog and/or digital user devices with SIP-based devices can be prohibitive at up to 50% of the total replacement cost of entire communications system.

In addition to contributing to higher capital deployment costs for enterprises, the loss of legacy PBX and key systems features and functionality specifically designed to meet enterprise needs is contributing to limiting SIP-based VoIP communication technology adoption. It would be advantageous to have systems and processes that provide the ability to bridge and extend use of legacy PBX and key systems.

SUMMARY

The present invention is directed to a system and process for bidirectional emulation of telephone communication. Exemplary embodiments of the system comprise an emulator module having a line signal dictionary. The line signal dictionary has line signal protocol entries which include associated telephone or external device type, waveform characterizations, traffic activity type data, and other characteristics. The emulator module is configured to receive and monitor line traffic between a telephone device and an external device in a communication environment. The emulator module is configured to translate telephone device to external device communication by comparison of received telephone device line traffic to corresponding telephone device and activity type entries in the line signal dictionary and translating the line traffic according to a corresponding external device and activity type entry in the line signal dictionary. The emulator module is further configured to translate external device to telephone device communication by comparison of received external device line traffic to corresponding external device and activity type entries in the line signal dictionary and translating the line traffic according to a corresponding telephone device and activity type entry in the line signal dictionary.

These and other features, aspects, and advantages of the invention will become better understood with reference to the following description, and accompanying drawings.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
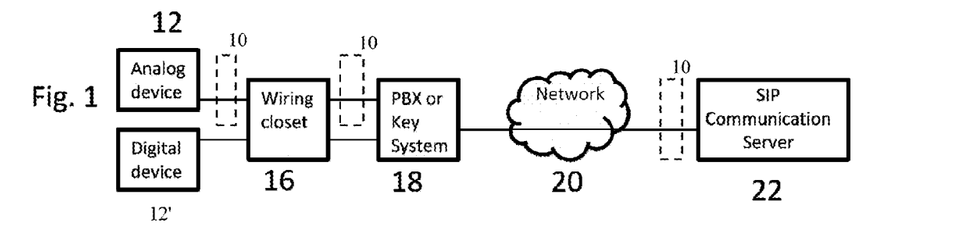
FIG. 1 is a block diagram of an embodiment of the invention as it may exist in operation.
Figure 6:
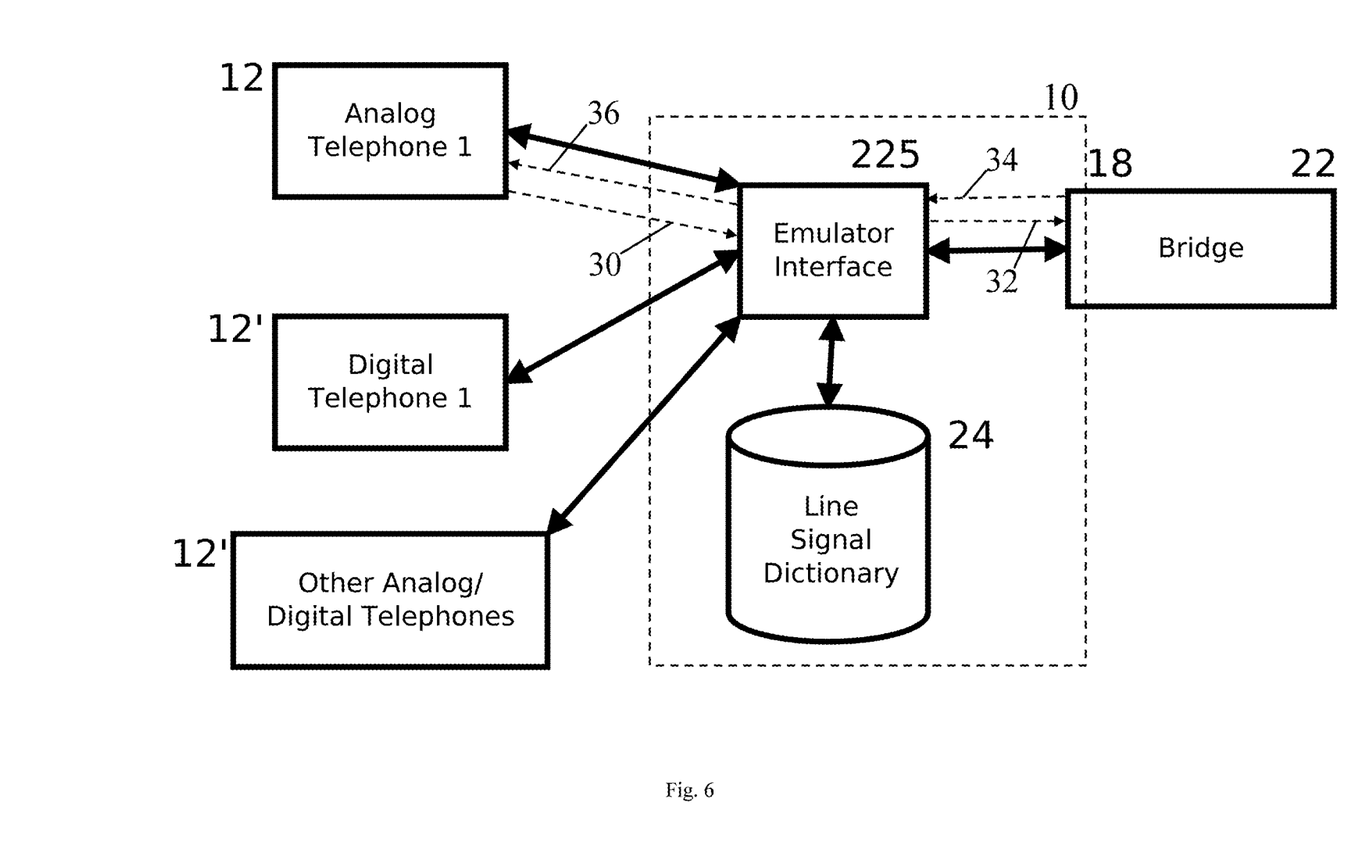
FIG. 6 is a block diagram of an embodiment of the invention as it may exist in operation.

The present invention is directed to a system and process for enabling communication between telephone communication devices of one line signal protocol with external incoming line signal traffic of a second protocol. FIGS. 1 and 6 illustrate embodiments of systems 10 that may be used to establish communication session using a legacy analog device 12 and/or digital device 12'. In the system shown in FIG. 1, an analog device 12 or a digital device 12' connected via a traditional wiring method 16 to a legacy PBX or key system 18 is used in establishing a communication session with a SIP communication server 22 for call control signaling and call information transmission. Existing wiring 16 may it be line or trunk connectivity is supported. The legacy PBX or key system 18 can be connected directly to a SIP communication server 22 or networked 20 via Public Switched Telephone Network (PSTN) or other means to the SIP communication server 22.

In one embodiment of the invention, the SIP communication server 22 is able to communicate with the legacy PBX or key system 18 interface in such a way as to enable identification and registration of the analog device 12 and/or digital device 12' with the SIP communication server 22 to permit interworking connectivity of these devices.

The SIP communication server 22 is able to identify the incoming call request and device type per pre-established configuration details thereby determining the calling features available for implementation.

In an embodiment of the invention, the SIP communication server 22 or emulation module 10 therein can then emulate the analog device 12 and/or digital device 12' and the call features supported with the legacy analog device 12 and/or digital device 12' and relay the call to another end point per call request and establish communication session.

The system 10 receives line signal output traffic 30 from telephones 12, operable to send and receive person to person calls, conference calls, initiate call forwarding, and other functions. Primary line signal output traffic 30 includes call control signaling and call content transmission. Representative telephone line signal output traffic 30 includes keypress signals, phone display messages, start and stops tones, switching tones (eg dial tones, ring back), switch speech path, audio/content traffic data, phone identification, and other traffic. Exemplary telephones 12 for interaction with the system 10 include analog telephones 12, digital telephones 12', and combinations 12' thereof.

Figure 2:
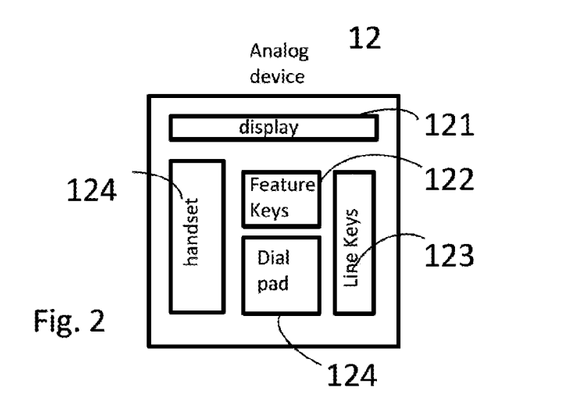
FIG. 2 is a diagram of an example analog device that may be used in operation with embodiment of the invention.

FIG. 2 illustrates an example of an analog device 12 that may be connected to a legacy PBX or key system 18. The example shown in FIG. 2 is a desktop analog telephone configured to be able to initiate and terminal calls using PBX or key system functionality. A desktop analog telephone 12 may have buttons that may be used for user access and control of particular features which, in turn, initiate associated line signal output traffic 30 from the telephone 12. For example, the desktop analog telephone 12 has a display 121 that may be used to show information about established calling line information or features available or in use.

For example, in the illustrated embodiment, the desktop analog telephone 12 includes a dial pad 124 to enable digit dialing to initiate call request or invoke device feature codes or legacy PBX or key system functionality. The desktop analog telephone 12 may include buttons referred to as feature keys 122 that may be programmed by users that when pressed enable particular calling features to be initiated, call requests, or invoke device feature codes or legacy PBX or key system functionality. The desktop analog telephone 12 may include buttons referred to as line keys 123 that when pressed enable analog line call request for establishing a calling session. According to an embodiment of the invention, the analog device features invoked by the user to initiate and terminate calls and invoke analog device features can be supported by a SIP communication server 22.

Figure 3:
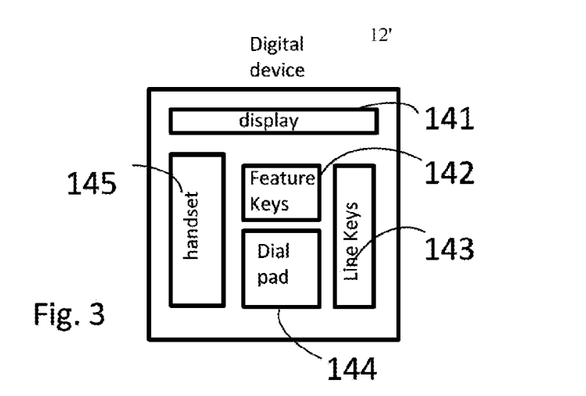
FIG. 3 is a diagram of an example digital device that may be used in operation with embodiment of the invention.

Similarly, FIG. 3 illustrates an example of a digital device 12' that may be connected to a legacy PBX or key system 18. The example shown in FIG. 3 is a desktop digital telephone 12' configured to be able to initiate and terminal calls using PBX or key system functionality. The desktop digital telephone 12' may have buttons that may be used for user access and control of particular features which, in turn, initiate associated line signal output traffic 30. For example, the desktop digital telephone 12' has a display 141 that may be used to show information about established calling line information or features available or in use.

For example, in the illustrated embodiment, the desktop digital telephone 12' includes a dial pad 144 to enable digit dialing to initiate call request or invoke device feature codes or legacy PBX or key system functionality. The desktop digital telephone 12' may include buttons referred to as feature keys 142 that may be programmed by users that when pressed enable particular calling features to be initiated, call requests, or invoke device feature codes or legacy PBX or key system functionality. The desktop digital telephone may include buttons referred to as line keys 143 that when pressed enable digital line call request for establishing a calling session. According to the embodiment of the invention, the digital device features invoked by the user to initiate and terminal calls and invoke digital device features can be supported by a SIP communication server 22. A representative type of digital desktop phone 12' is a Nortel M3904 model.

As disclosed above, exemplary telephones 12 for interaction with the system 10 include analog telephones, digital telephones, and combinations thereof. A third major category of telephones includes VOIP telephones (not pictured). A VOIP telephone includes buttons to enable digit dialing to initiate call requests, invoke local device feature codes, or invoke telephone to PBX, key system, or server functionality. Representative, non-exclusive VOIP protocols include SIP, H.323 and H.248 based, and SIGTRAN.

Figure 4:
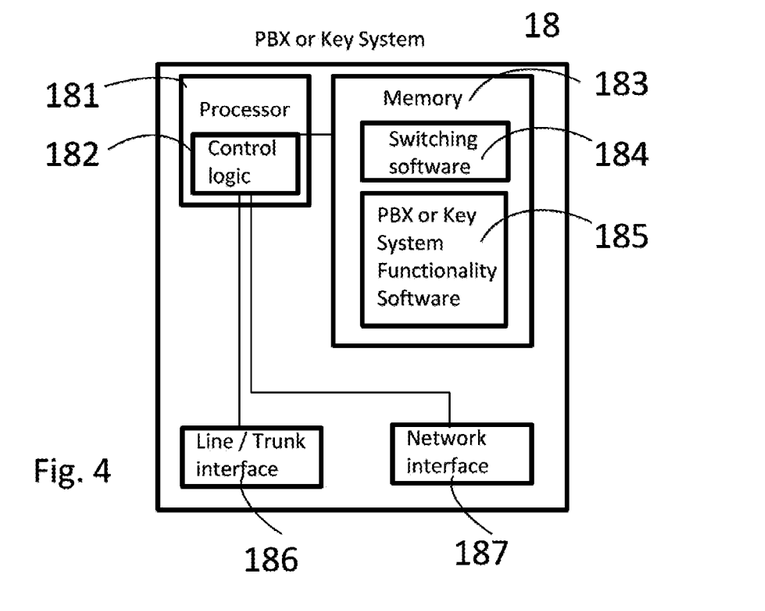
FIG. 4 is a block diagram of an example of PBX or key system which may be used in conjunction with an embodiment of the invention.

FIG. 4 illustrates a legacy PBX or key system 18 that may be configured to establish communication session for legacy analog device 12 and/or digital device 12'. In the embodiment illustrated in FIG. 4, the legacy PBX or key system includes a processor 181 having control logic 182 configured to enable the communication function of the attached devices. The legacy PBX or key system includes a memory 183 in which switching software 184 and PBX or key system functionality software 185 are stored. The legacy PBX or key system includes a line and trunk interface 186 and a network interface 187. The software components in conjunction with the processor, control logic line or trunk interface and network interface, enable the legacy PBX or key system to establish communication sessions with analog and/or digital devices and/or other types of devices, either within the legacy PBX or key system or external to the network.

The PBX or key system functionality software 185 contains the defined functions that enable the analog and/or digital device 12 features and the PBX or key system features to be accessed and executed. This software is generally proprietary to a manufacturer. The specific features and functionality implemented within this software can often be available only for a specific device, PBX or key system 18 supplied by a specific manufacturer. In the embodiment of the invention, these features and functionality may be emulated by the SIP communication server 22 in such a way as to enable registered telephones devices 12 within the SIP communication server network 20 to have the same equivalent capabilities permitting transparent and continued feature usage with a SIP communication server 22.

Figure 5:
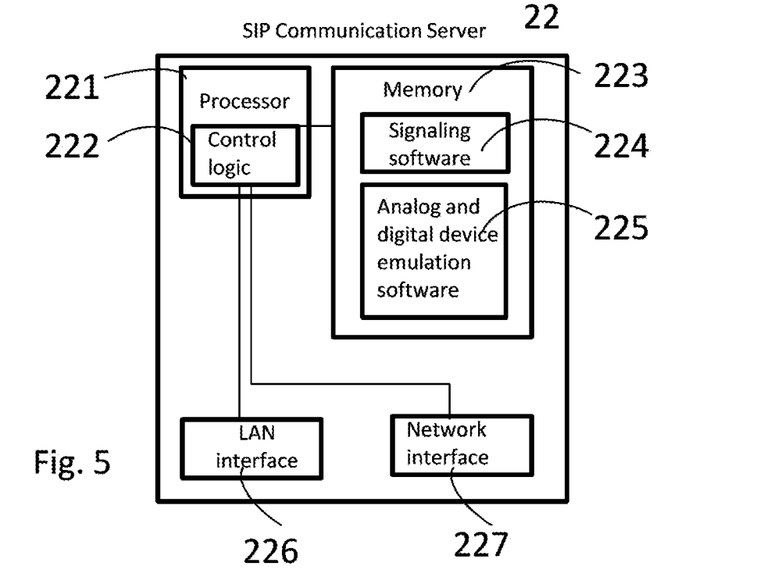
FIG. 5 is a block diagram of an example of SIP communication server which may be used in conjunction with an embodiment of the invention.

FIG. 5 illustrates a SIP communication server 22 that may be configured to establish communication session for registered SIP devices that may be configured in the network 20. In the embodiment illustrated in FIG. 5, the SIP communication server 22 includes a processor 221 having control logic 222 configured to enable the communication function of the attached devices. The SIP communication server system includes memory 223 in which signaling software 224 and analog and digital device emulation module 10 are stored. In certain configurations, the emulation module 10 can be communicatively interposed between the telephone device 12 and the site's line traffic exit site, between the telephone device 12 and the PBX or key system, between the telephone device 12 and the communication server 22, as shown in FIG. 1.

The SIP communication server includes a LAN interface 226 and a network interface 227. The software components in conjunction with the processor, control logic, LAN interface and network interface, enable the SIP communication server to establish communication sessions with SIP devices and/or other types of devices, either within the SIP communication system network or external to the network.

In the embodiment illustrated, the analog and digital device emulation module 10 contains the functional logic that enable the direct registration of telephone devices 12 that may be connected on the PBX or key system 18. After these devices are registered, the device emulation module 10 can emulate the available features of the registered analog and digital devices. For example, the desktop analog telephone and the desktop digital telephone may be registered with the SIP communication server 22. Features of the desktop analog telephone and the desktop digital telephone may be provided such as to retain and enable transparent and continued feature usage with a SIP communication server.

Figure 9:
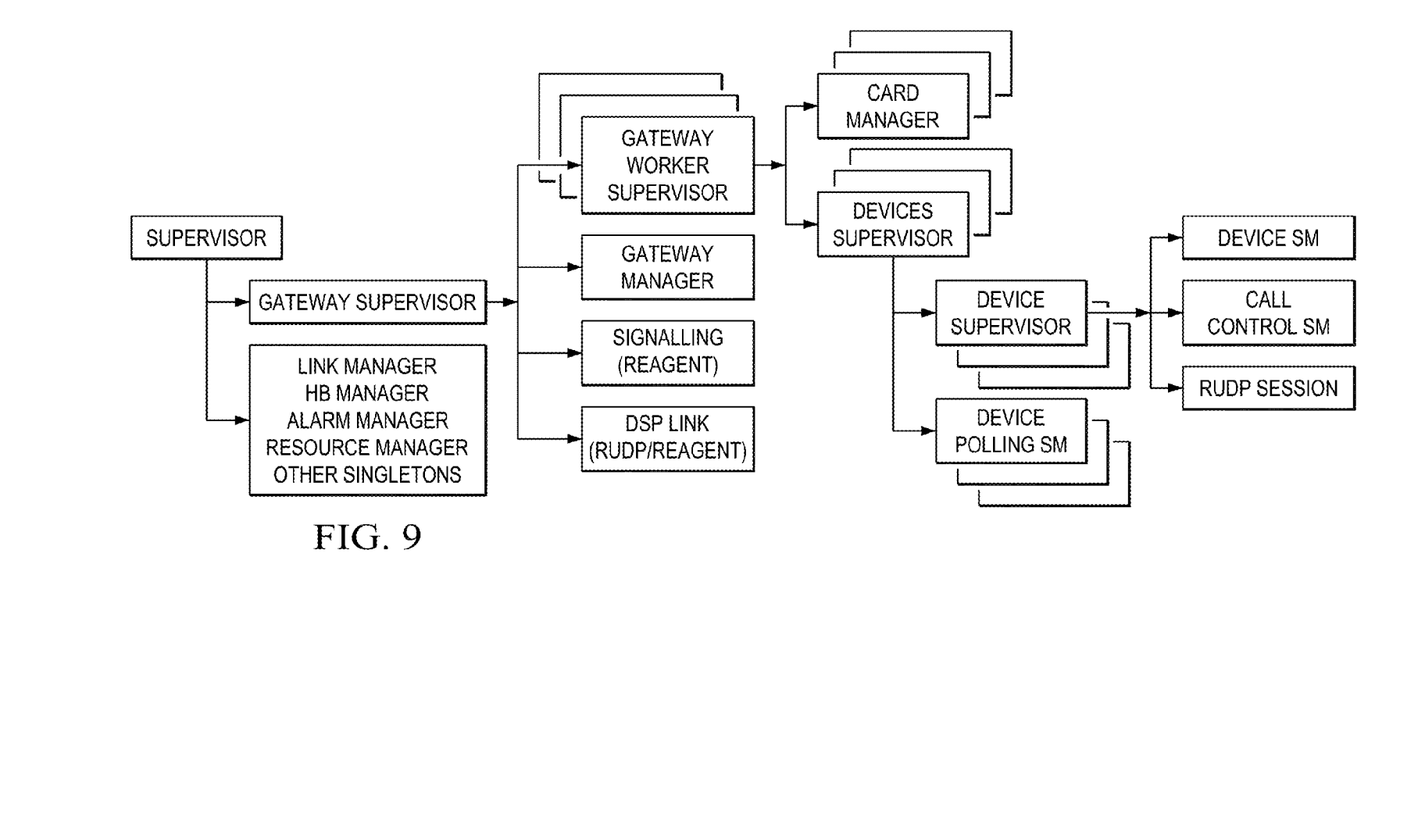
FIG. 9 is block diagram of an alternate embodiment of the invention.

In the embodiment illustrated, the analog and digital device emulation module 10 contains the functional logic to emulate the available features of the PBX or key system that may be connected with the SIP communication server 22. The PBX or key system features and functionality may be emulated by the SIP communication server 22 in such a way as to enable registered telephone devices 12 within the SIP communication server network 20 to have the same equivalent capabilities permitting transparent and continued feature usage on a SIP communication server 22 as would be available when registered with a legacy PBX or key system 18. In an embodiment, users with telephone devices 12 such as desktop analog telephone and the desktop digital telephone may utilize available features and functionality that would be available on a PBX or key system 18 but operate as registered devices in a SIP communication server network 20. FIG. 9 shows a representative architecture of a system.

With reference to FIG. 6, as disclosed, the emulator module 10 is operable to translate telephone device traffic to external traffic. More specifically, the emulator module 10 translates outgoing line signal output traffic 30 from the line signal protocol of the telephone device 12 to outgoing line signal output traffic 32 of the protocol of a designated external device, the PBX/key system or communication server 18 as pictured. More specifically, the emulator module 10 translates incoming line signal output traffic 34 from the line signal protocol of the external device (the PBX/key system or communication server 18 as pictured) to incoming line signal output traffic 36 of the protocol of the telephone device 12.

The emulator module 10 translation is facilitated via a line signal dictionary 24. The line signal dictionary 24 contains the line signal protocol of a telephone device 12 or an external device 18 22. The line signal protocol includes waveform or waveform characterizations corresponding to different line traffic activity such as call control signaling or call content transmission. For example, a line signal protocol waveform may represent a keypress, phone display message, start or stops tone, switching tones such as a dial tone or ring back tone, call content data, or phone identification. In exemplary configuration, a line signal protocol entry includes a type of telephone device 12, a line signal activity type, and a waveform representation of that line signal activity type. In one configuration, line signal protocol entries are created from publicly available information. In another configuration, a line monitor is used to capture waveform fragments from different line traffic activity.

Figure 8:
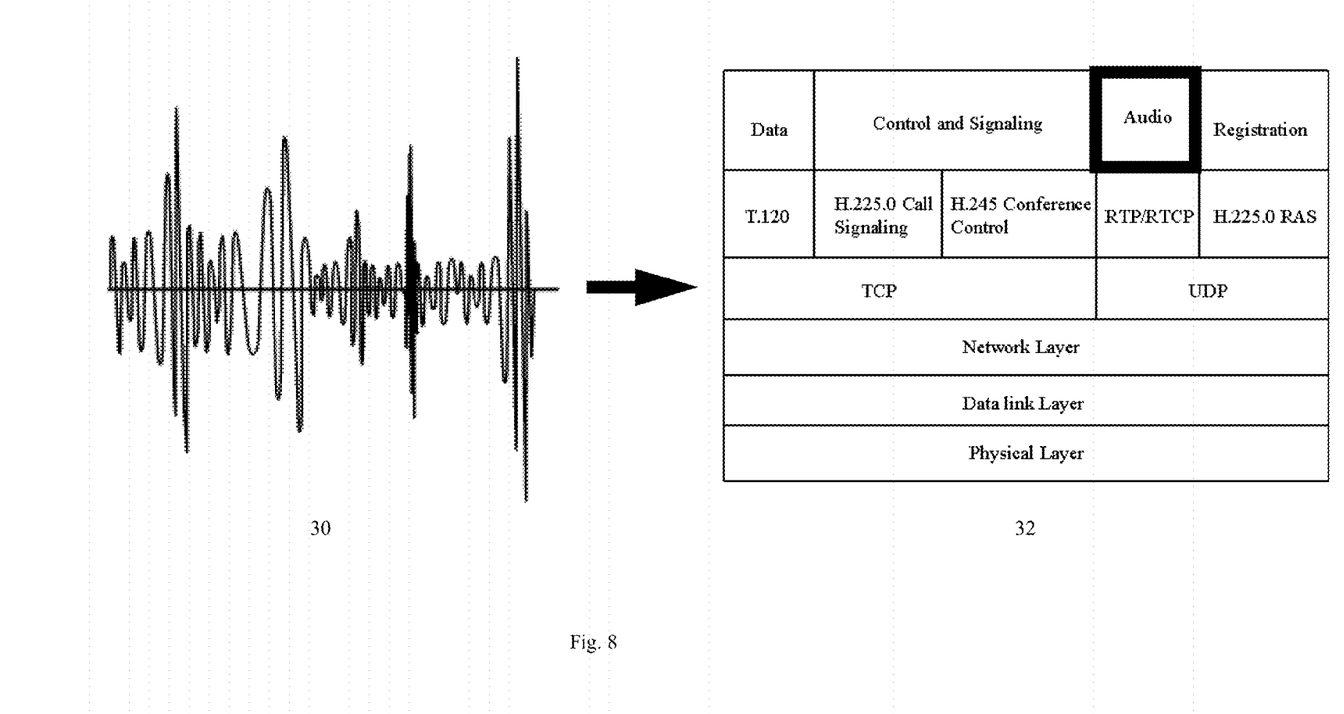
FIG. 8 illustrates a represent telephone device output line traffic fragment and its emulator module translation.

FIG. 8 represents a representative outgoing line signal output traffic 30 from the line signal protocol of the telephone device 12 to outgoing line signal output traffic 32 of the protocol of a designated external device, the PBX/key system or communication server 18, where the illustrated emulator module 10 input is an outgoing line signal output traffic 32 waveform fragment representing an analog call content and the emulator module 10 output waveform characterization in the form of a SIP stack packet having digitized call content as outgoing line signal output traffic 32.

Figure 7:
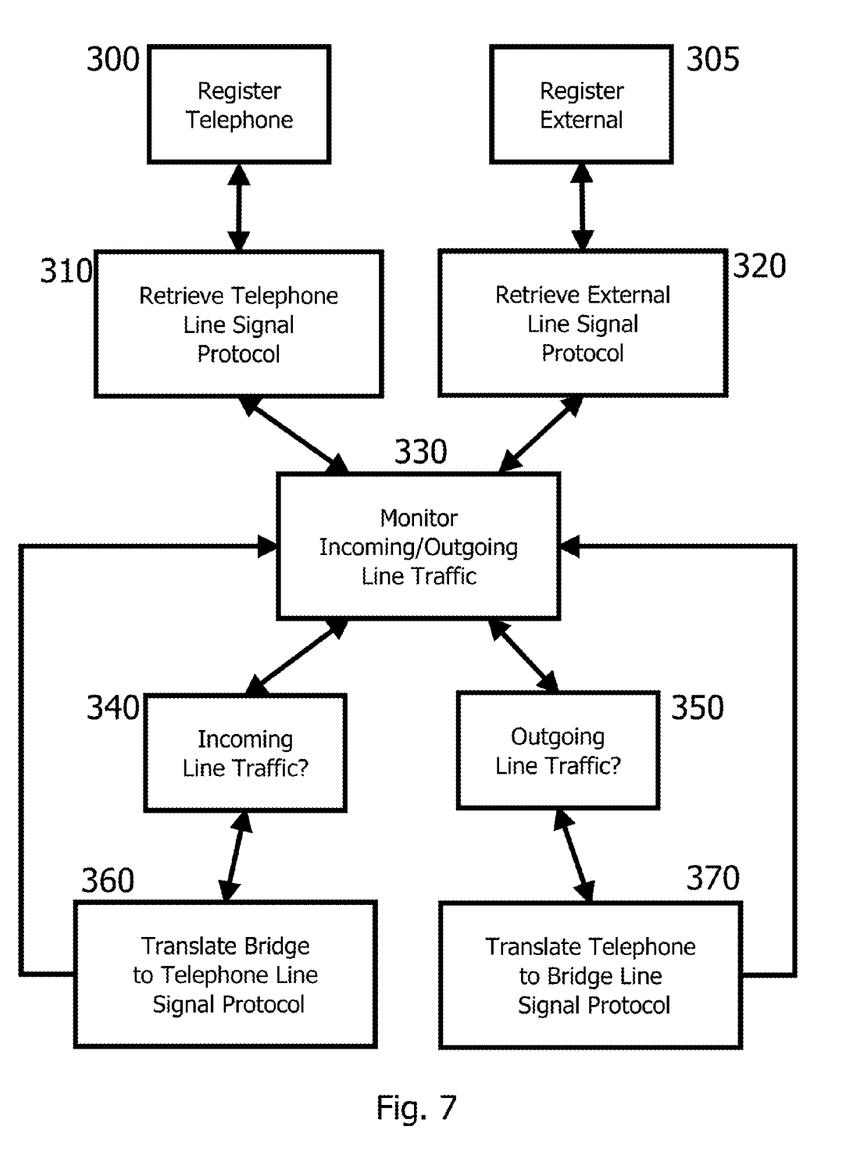
FIG. 7 is a process diagram implemented to the embodiment of FIG. 6 as it may exist in operation.

Having disclosed major elements of the system 10, operation of the system 10 is now disclosed. FIG. 7 illustrates exemplary process of use of the system. A telephone device is registered in the system 300. An external device is selected 305. The line signal protocol for the telephone device is retrieved 310. The line signal protocol for the external device is retrieved 320. Incoming and outgoing traffic is monitored 330. Incoming line traffic is detected 340 and translated 360. Outgoing line traffic is detected 350 and translated 370. More consideration to each of the steps is described below.

At step 305 an external device is selected for the environment. For example, a SIP communication server may be selected. At step 320, the emulator module 10 retrieves the line signal protocol for the selected external device.

At step 300, telephone devices 12 are registered with the emulator module 10. The telephone devices 12 are registered, connected, and identified. The emulator module 10 may receive telephone device 12 type identification by manual input, port mapping, line signal output traffic 30, and/or other means known in the art. At step 310, the line signal protocol for the registered device is retrieved.

At step 330, emulation module 10 monitors the line for outgoing line traffic 30 and incoming line traffic 34. For outgoing line traffic 30, the emulation module 10 determines the line traffic type by comparing the waveform fragments to those in the line signal dictionary 24 entries of the registered telephone device 12. The emulation module 10 then translates the waveform fragment 360 to that of the external line signal protocol with reference to the line signal dictionary 24 entries of the external device 22. For incoming line traffic 34, the emulation module 10 determines the line traffic type by comparison to the waveform fragments to those in the line signal dictionary 24 entries of the external device 22. The emulation module 10 then translates the waveform fragment 370 to that of the telephone device 12 line signal protocol with reference to the line signal dictionary 24 entries of the telephone device 12.

Insofar as the description above and the accompanying drawing disclose any additional subject matter that is not within the scope of the single claim below, the inventions are not dedicated to the public and the right to file one or more applications to claim such additional inventions is reserved.

What is claimed is:

1. A system for bidirectional emulation of telephone communication, said system comprising:
   an emulator module having a line signal dictionary;
   said line signal dictionary having line signal protocol entries corresponding to telephone device type and communication protocols, said communication protocols including call control, call signaling, and call content protocols;
   said emulator module configured to receive and monitor incoming and outgoing line traffic between a telephone device and an external telephone system;
   said emulator module configured to retrieve the communication protocol entry for said external telephone system from said line signal dictionary and retrieve the communication protocol entry for telephone device from applicable call control, call signaling, and call content protocols entries of said line signal dictionary;
   said emulator module configured to translate said outgoing line traffic of said telephone device to the communication protocol of said external phone system according to said retrieved protocols and to translate said incoming line traffic to said telephone device from said external phone system according to said retrieved protocols.

2. The device of claim 1, wherein said telephone device is an analog device.

3. The device of claim 1, wherein said telephone device is a digital device.

4. The device of claim 1, wherein said telephone device is a Nortel M3904.

5. The device of claim 4, wherein said external telephone system is a SIP communication server.

6. The device of claim 1, wherein said line signal entry data includes device type, waveform characterizations, and traffic type data.

7. The device of claim 1, wherein identification of said telephone device or said external telephone system is received from manually input.

8. The device of claim 1, wherein identification of said telephone device or said external telephone system is facilitated by lookup to ports to which said telephone device or said external telephone system are connected.

9. The device of claim 1, wherein identification of said telephone device or said external telephone system is retrieved by real-time analysis of line signal traffic and comparison to line signal entries.

10. The device of claim 1, wherein said emulator is communicatively interposed adjacent said telephone device.

11. A process for bidirectional emulation of telephone communication, said process comprising:
    providing an emulator module having a line signal dictionary, said line signal dictionary having line signal protocol entries corresponding to telephone device type and communication protocols, said communication protocols including call control, call signaling, and call content protocols;
    communicatively interposing the emulator module to receive and monitor incoming line traffic and outgoing line traffic between a telephone device and an external telephone system;
    said emulator module retrieving the communication protocol entry for said external telephone system from said line signal dictionary and retrieving the communication protocol entry for telephone device from applicable call control, call signaling, and call content protocols entries of said line signal dictionary;
    said emulator module translating said outgoing line traffic of said telephone device to the communication protocol of said external phone system according to said retrieved protocols and to translating said incoming line traffic to said telephone device from said external phone system according to said retrieved protocols.

12. The process of claim 11, wherein said telephone device is an analog device.

13. The process of claim 11, wherein said telephone device is a digital device.

14. The process of claim 11, wherein said telephone device is a Nortel M3904.

15. The process of claim 14, wherein said external telephone system is a SIP communication server.

16. The process of claim 11, wherein said line signal entry data includes device type, waveform characterizations, and traffic type data.

17. The process of claim 11, wherein identification of said telephone device or said external telephone system is received from manually input.

18. The process of claim 11, wherein identification of said telephone device or said external telephone system is facilitated by lookup to ports to which said telephone device or said external telephone system are connected.

19. The process of claim 11, wherein identification of said telephone device or said external telephone system is retrieved by real-time analysis of line signal traffic and comparison to line signal entries.

20. The process of claim 11, wherein said emulator is communicatively interposed adjacent said said telephone device.

* * * * *